United States Patent [19]
Goossen et al.

[11] Patent Number: 5,949,571
[45] Date of Patent: Sep. 7, 1999

[54] MARS OPTICAL MODULATORS

[75] Inventors: Keith Wayne Goossen, Aberdeen; James Albert Walker, Howell, both of N.J.

[73] Assignee: Lucent Technologies, Murray Hill, N.J.

[21] Appl. No.: 09/126,352

[22] Filed: Jul. 30, 1998

[51] Int. Cl.[6] .................................................. G02B 26/08

[52] U.S. Cl. ........................ 359/291; 359/223; 359/224; 359/290; 359/295; 359/318; 430/321

[58] Field of Search ..................................... 359/223, 224, 359/290, 291, 295, 318; 430/321

[56] References Cited

U.S. PATENT DOCUMENTS

| | | | |
|---|---|---|---|
| 5,500,761 | 3/1996 | Goossen et al. | 359/290 |
| 5,589,974 | 12/1996 | Goosen et al. | 359/290 |
| 5,701,193 | 12/1997 | Vogel et al. | 359/290 |
| 5,739,945 | 4/1998 | Tayebati | 359/291 |
| 5,825,528 | 10/1998 | Goossen | 359/291 |

*Primary Examiner*—Georgia Epps
*Assistant Examiner*—Margaret Burke

[57] ABSTRACT

The specification describes a double poly Mechanical Anti-Reflection Switch (MARS) device in which shorting between the lower poly metallization and the silicon substrate is prevented by providing an insulating layer on the surface of the silicon substrate.

22 Claims, 7 Drawing Sheets

$m\lambda/4$ gap $(m-1)\lambda/4$ gap

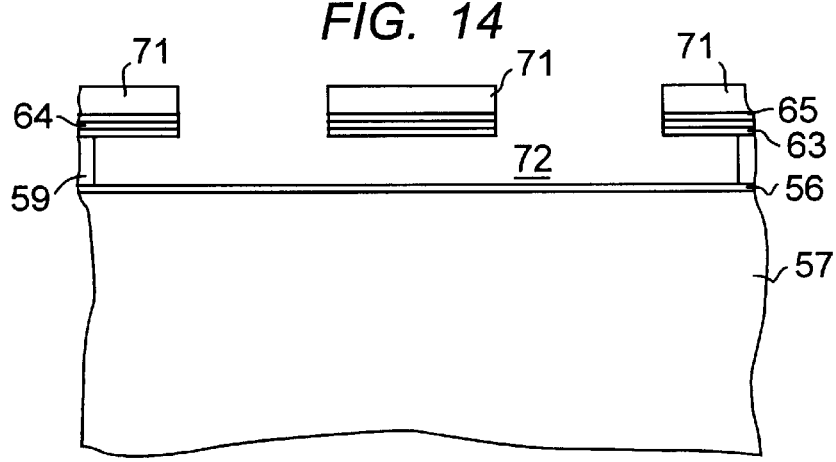
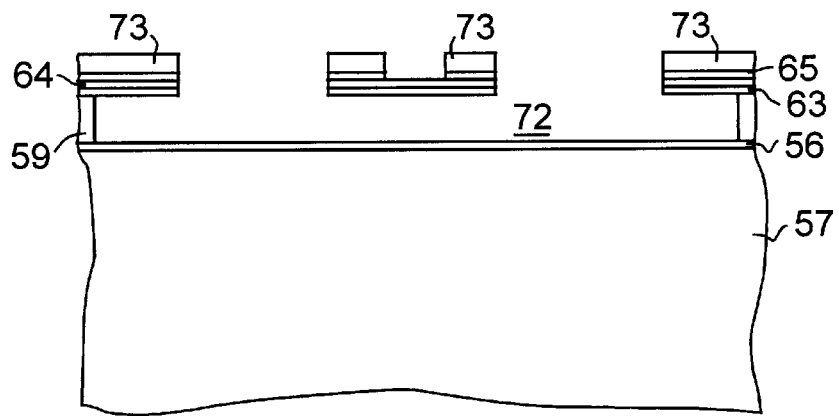
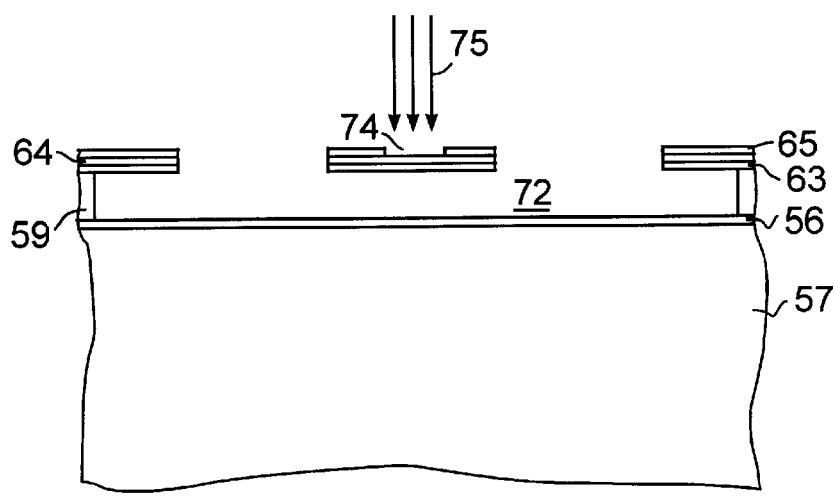

MARS OPTICAL MODULATORS

FIELD OF THE INVENTION

The invention relates to Moving Anti-Reflection Switch (MARS) devices.

BACKGROUND OF THE INVENTION

There exists in telephone network technology a continual need to increase the available bandwidth. Traffic on the World Wide Web and similar networks is growing rapidly, and new networks are developing. A number of photonic solutions have been offered that increase the available bandwidth of these networks. These solutions range from point to point connections, to wavelength division multiplexed passive optical network systems. The latter solution is effective in principle, however the cost associated with photonic devices in these systems has been an impediment to their acceptance and rapid deployment.

Recent proposals for wavelength multiplexed passive systems utilize an optical modulator at the subscriber location to replace the active LED or laser devices proposed in prior art systems. See, for example, L. Altwegg, A Azizi, P. Vogel, Y. Wang, and P. Wiler, "LOCNET—a fiber-in-the-loop system with no light-source at the subscriber end", *J. of Lightwave Tech.*, vol. 12, no. 3, pp. 535–540,1994; also see: N. J. Prigo, P. D. Magill, T. E. Darcie, P. P. Iannone, M. M. Downs, B. N. Desai, U. Koren, T. L. Koch, C Dragone, and H. M. Presby, "RITE-Net: A passive optical network architecture based on the remote interrogation of terminal equipment," *Proc. of the Optical Fiber Conference—post deadline session,* (San Jose, Calif., Feb. 20–25, 1994) pp. 43–47. This approach has several advantages, among them lower cost and higher reliability. The passive devices are also less sensitive to temperature variations, and have a robustness suitable for the uncontrolled environment at some customer locations. Additionally, wavelength routing in the network is more reliable since the upstream light is identically the same wavelength as the downstream light.

Recently, a low-cost silicon optical modulator has been developed based on micro electro mechanical systems principles (MEMS) which fulfills the foregoing objectives, e.g. a low-cost, high production volume, modulator. The device has been designated MARS, for Moving Anti-Reflection Switch. In a preferred form, this device has a multi-layer film stack of polysilicon/silicon nitride/polysilicon, wherein the polysilicon is doped and comprises the electrode material. A precisely controlled air gap between the film stack and the substrate allows switching from a reflecting state to an anti-reflecting state. The multi-layer film configuration has been found to give low drive voltage, large optically active area, and good spectral characteristics. It performs well in many system applications but in certain relatively uncontrolled electrical environments, as in some telephone applications, the potential for catastrophic failure arises due to spurious voltage spikes or large changes in the dielectric properties of the air gap. Failure results when the optically active membrane flexes too far and the lower polysilicon metallization shorts to the silicon substrate.

SUMMARY OF THE INVENTION

We have developed an improved MARS device design that is immune to this failure mode. The improved design incorporates an insulating buffer layer between the substrate and the lower polysilicon metallization. The preferred buffer layer is a silicon nitride layer on the silicon substrate. It is found that electro-optic performance is not compromisedb the presence of the buffer layer.

BRIEF DESCRIPTION OF THE DRAWING

FIG. 6, FIG. 7, FIG. 8, FIG. 9, FIG. 10, FIG. 11, FIG. 12, FIG. 13, FIG. 14, FIG. 15 and FIG. 16 are schematic representations of process steps useful in fabricating the improved MARS device of the invention.

DETAILED DESCRIPTION

Figure 1:
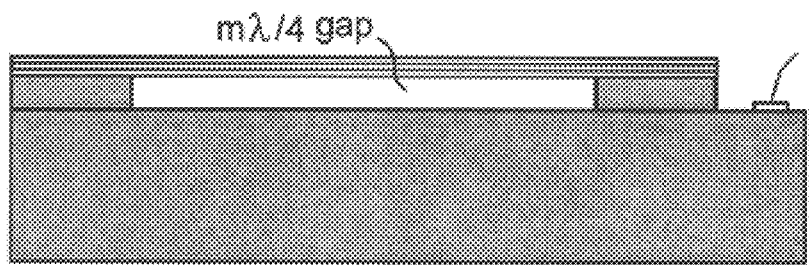
FIG. 1 is a schematic representation of the operation of a moving anti-reflection switch or MARS device showing the reflection state of the switch.

The operating principle of the MARS device is based upon the change in an air gap between a suspended membrane, e.g. a silicon nitride film, and the underlying substrate as seen in FIG. 1. The membrane has a refractive index equal to the square root of the refractive index of the substrate, and a thickness equal to ¼ of the wavelength of the incident light $\lambda$. The membrane is suspended by a web comprising the optically active film, i.e. the silicon nitride film, and metallization on one or both sides of the film. In some embodiments the metallization is selectively applied to leave a window for the optical beam.

In the most fundamental case, if the air gap is equal to zero (contact with the substrate), a typical anti-reflection condition is achieved. If the nitride film is suspended above the substrate by an air gap equal to $\lambda/4$ however, a high reflection (>70%) condition is achieved. As could be expected, this relationship would hold for any value of $m\lambda/4$ (m even—anti-reflecting, m odd—reflecting). For a typical MARS device, an initial air gap of $3\lambda/4$ is used to avoid stiction problems during operation and enhance the lifetime of the devices.

Figure 2:
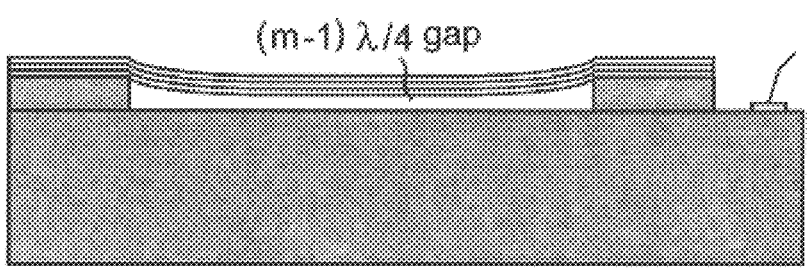
FIG. 2 is a representation similar to that of FIG. 1 showing the switch in the anti-reflecting state.

The reflecting state is illustrated in FIG. 1 and the anti-reflecting state is illustrated in FIG. 2. For more details of the basic MARS device see K. W. Goossen, J. A. Walker, and S. C. Arney, "Silicon modulator based on Mechanically-Active Anti-Reflection layer with 1 Mbit/sec capability for fiber-in-the-loop applications," *IEEE Phot. Tech. Lett.,* vol. 6, pp. 1119–1121, Sep. 1994.

In the preferred MARS structure the flexible membrane shown in FIGS. 1–4 comprises a three layer structure with the optically active layer sandwiched between conductive films. The optically active layer is preferably silicon nitride, but other materials, e.g. $SiO_xN_y$ with suitable refractive indices may be substituted. The conductive films are preferably polysilicon or amorphous silicon. This MARS structure is often referred to as a double-poly MARS device, and is described and claimed in U.S. Pat. No. 5,654,819, issued Aug. 5, 1997, which is incorporated herein by reference.

Figure 3:
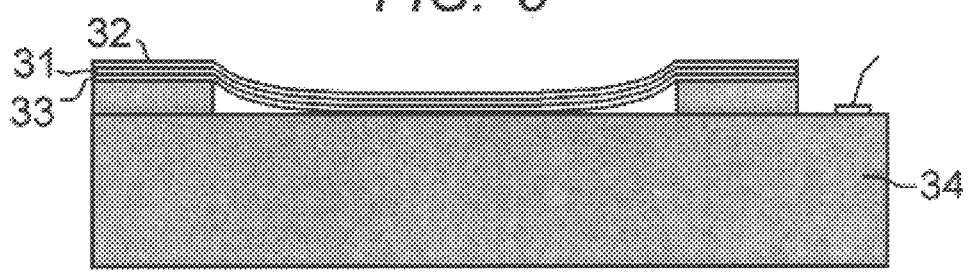
FIG. 3 is a schematic view of MARS device illustrating the failure mode of the device of FIGS. 1 and 2, which the invention overcomes.

While the double-poly MARS device performs well optically and electrically, it has a potential catastrophic failure mode due to the lower polysilicon metallization. This failure mode is illustrated in FIG. 3, where the flexible membrane 31 is metallized on the top of the membrane with metallization 32, and on the bottom of the membrane with metallization 33. Metallization as referred to here may be any suitable conductive material, preferably polysilicon. In certain adverse environments or with unusual voltage surges in the switching signal the membrane undergoes excessive deflection and the metallization layer 33 shorts to the substrate 34.

Figure 4:
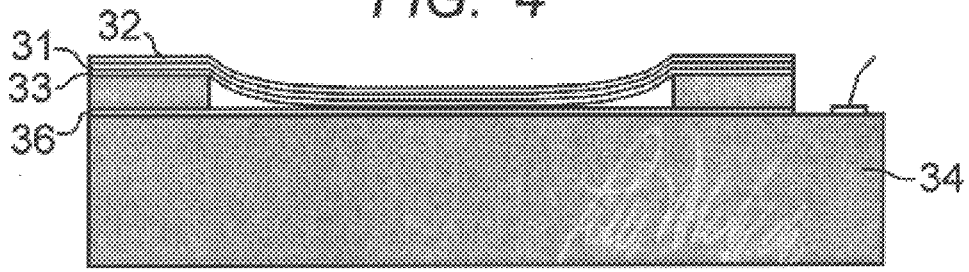
FIG. 4 is a topographical view of the device of FIGS. 1 and 2.

To avoid the potential for this failure mechanism, the substrate 34 is coated with an insulating layer 36, as shown in FIG. 4. The insulating layer prevents electrical contact between the lower poly metallization 33 and the substrate 34.

Figure 5:
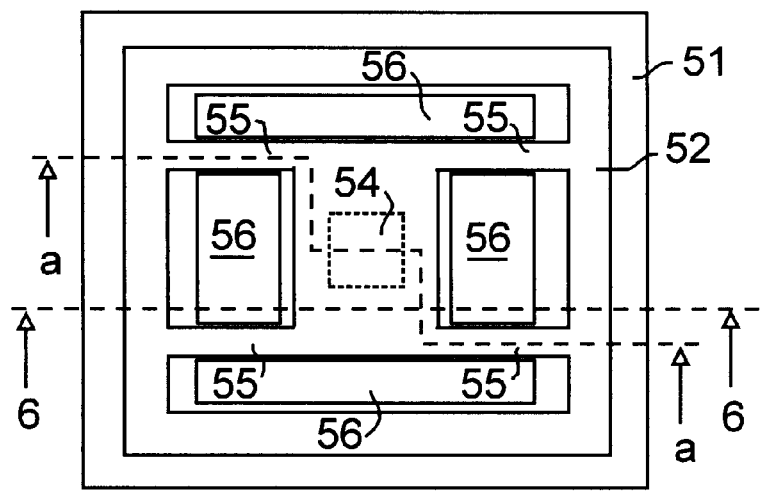
FIGS. 5 is a sectional view through 5—5 of FIG. 4.

A typical MARS device is shown in plan view in FIG. 5. The section a—a is the view shown in FIGS. 1–4. The sectional views used for FIGS. 1–4, which are not to scale, are used to illustrate the basic electrostatic mechanism for the MARS device. The overall device structure is better illustrated in FIG. 5, where the silicon nitride membrane is shown at 51, and the top poly metallization layer at 52. The optically active region comprises region 54 where the beam is incident on the MARS structure. In some embodiments of this structure, regions 54 may comprise a window where a portion of the silicon nitride layer 51 is exposed through the pattern of metallization 52. This window is normally required if an opaque metal is substituted for polysilicon. The polysilicon metallization on the underside of the silicon nitride layer 51 is patterned with a pattern similar to that of the top poly metallization. Openings through the three layer sandwich structure are formed where the substrate (actually the insulating coating 56 on the substrate) is visible. These openings form the weblike structure that suspends the silicon nitride active optical region over the air gap. In the geometry shown, there are four arms 55 supporting the flexible window. Other support arrangements can be used having e.g. three, or even two, support arms, or more than four if desired. For example, a preferred device structure has a circular suspended membrane which is continuously supported around its edge. See U.S. Pat. No. 5,751,469 issued May 12, 1998. In a typical embodiment this device has an array of holes arranged on hexagonally spaced centers and suitable spacing, e.g. 3 micron holes and 10 microns center to center.

In FIG. 5, a portion of the nitride layer 51 is left visible to aid in understanding the structure. In most actual processes used to form this structure, the three layers will be patterned simultaneously using a single mask, and will show as a single layer in the plan view.

Figure 6:
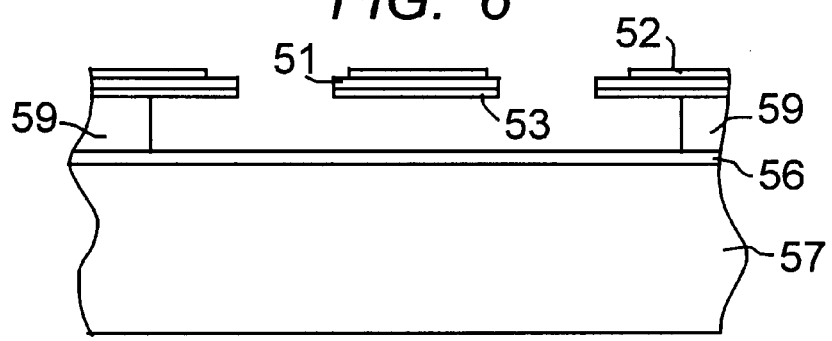

An understanding of the MARS device structure shown in FIG. 5 may be further enhanced with the aid of a typical processing sequence used to form the device. FIG. 6 shows a section 6—6 through FIG. 5 as indicated, and represents the goal of the processing steps. The thick standoff layer 59 is visible in FIG. 6, and its thickness, and the thickness of the insulating layer 56, combine to determine the critical spacing between the silicon substrate 57 and the optically active film stack 51,52,53. Also shown in FIG. 6 is the insulating layer 56, a main feature of the invention.

The geometry shown in FIGS. 5 and 6 is for a device operating in the 1–2 Mbit/sec range. In this particular embodiment the mechanically active area consists of a 30 $\mu$m×30 $\mu$m plate suspended by 50 $\mu$m-long arms 55. The optical window 54 in this device is 22 $\mu$m×22 $\mu$m. The electrode layer 52, formed by conventional metallization techniques, i.e. photolithographic patterning, has a tab portion (not shown) that extends to a bonding pad to accommodate a wire bond to a header pin. Suitable low cost packages for these devices are described and claimed in U.S. Pat. No. 5,647,044.

The specific embodiment described here is based on micro electro mechanical systems principles that use surface micromachining techniques to form thin film microstructures. An advantage of these techniques is the batch fabrication of several thousand chips at a time, making the cost per chip extremely low (a few cents per chip).

Figure 7:
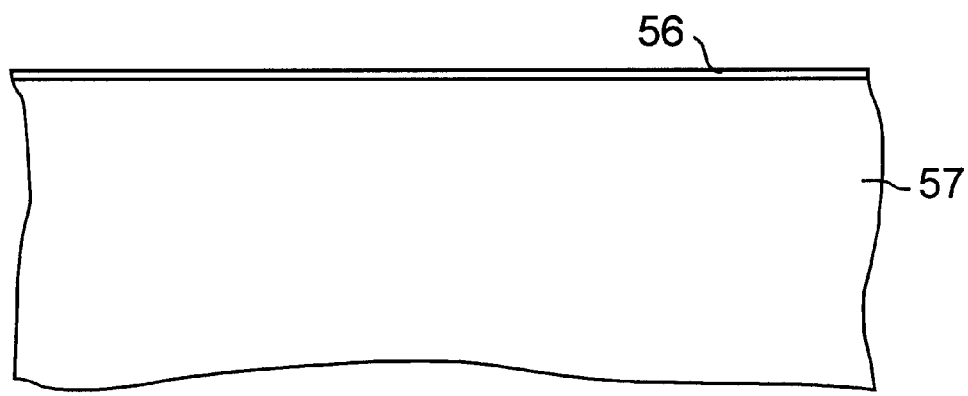

With reference to FIG. 7, the silicon substrate 57 is shown with insulating layer 56. The material of layer 56 may be any suitable insulator but preferably is one that withstands etching of layer 59, i.e. has preferential etch characteristics with respect to the material, preferably glass, of layer 59. The preferred insulating material is silicon nitride, which resists etching by HF etchants used to dissolve layer 59. The silicon nitride layer may be deposited by CVD, or preferably by LPCVD. The thickness of layer 56 is preferably less than $\frac{1}{8}^{th}$ of the operating wavelength. As an example, if the MARS device is used to switch laser radiation at 1.55 $\mu$m, the thickness of layer 56 should be less than 2000 Angstroms, and is preferably less than 1000 Angstroms.

Figure 8:
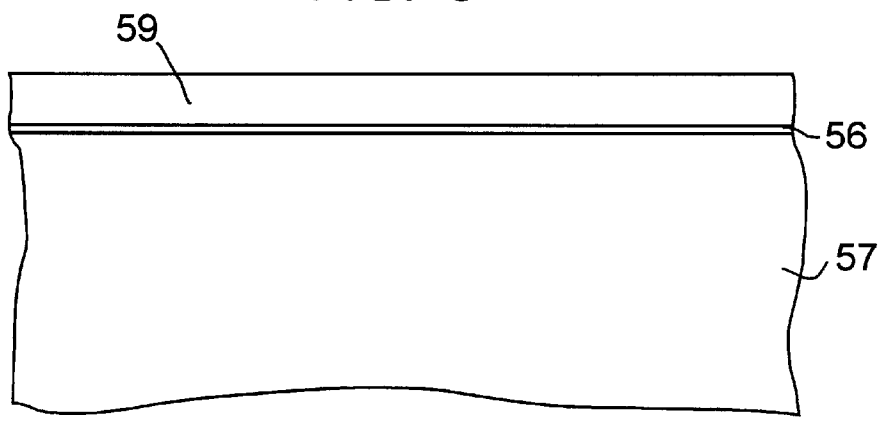

The spacer layer 59 is deposited over the insulating layer as shown in FIG. 8. This layer is sacrificial in the active device region, as shown in FIG. 6, and therefore is preferably of a material that etches easily and isotropically. Glass is the preferred material for this layer. The specific glass composition is not critical and a wide variety of glass materials may be suitable. In the devices made to demonstrate the invention the glass was conventional phosphosilicate glass (PSG). Alternatively, other glass compositions, including $SiO_2$, can be used.

Figure 9:
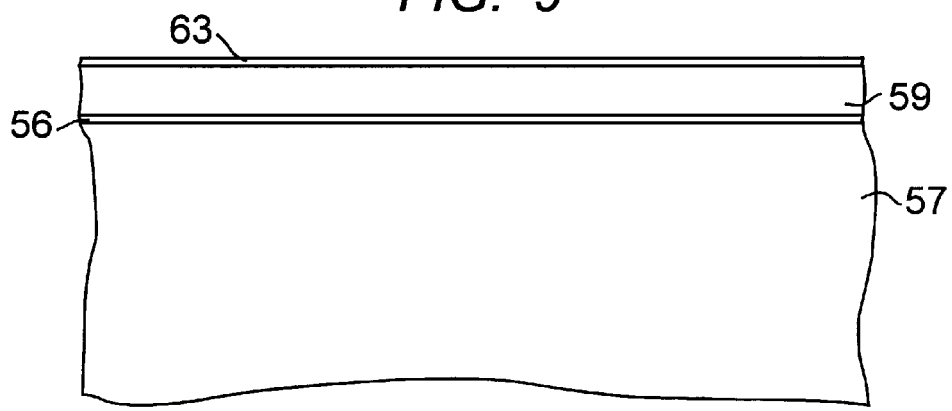
Figure 10:
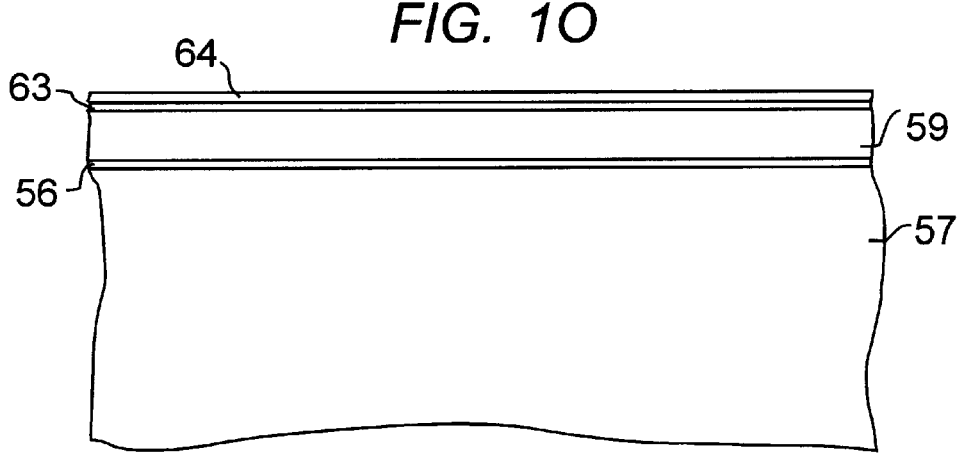
Figure 11:
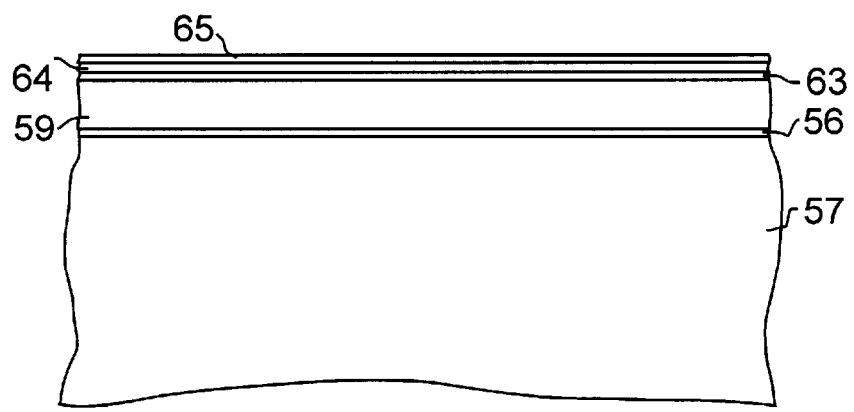

The next step is to deposit the three layer membrane. As shown in FIG. 9, the first polysilicon layer 63 is deposited over glass layer 59. Reference herein to polysilicon is for convenience, it being understood by those skilled in the art that amorphous silicon can be substituted. As depicted in FIG. 10, a silicon nitride layer 64 is deposited over the polysilicon layer 63, followed by deposition of the second polysilicon layer 65, as shown in FIG. 11. Suitable deposition techniques for layers 63–65 are well known and not part of the invention. The layers can be formed e.g. by LPCVD. The thickness of the metallization layer 63 is preferably one-quarter wavelength of the radiation being switched, as measured in the metallization material. For example, if the metallization is polysilicon, and the beam being switched is 1.55 $\mu$m, the thickness of layer 63 is preferably approximately 1100 Angstroms. The thickness of layer 65 is preferably one-half the wavelength. An advantage of using polysilicon for layers 63 and 65 is that the index of refraction of these layers essentially matches the index of refraction of substrate 57. It is also relatively transparent to laser radiation of interest, i.e. 1.3 $\mu$m and 1.55 $\mu$m.

Layer 64 preferably has a refractive index approximately equal to the square root of the substrate, and has a thickness of one-quarter wave. Techniques for tailoring the refractive index of a material are well known and described in, e.g., Smith et al, "Mechanism of $SiN_xH_y$ Deposition From $N_2$—$SiH_4$ Plasma", J. Vac. Sci. Tech. B(8), #3, pp 551–557 (1990).

Figure 12:
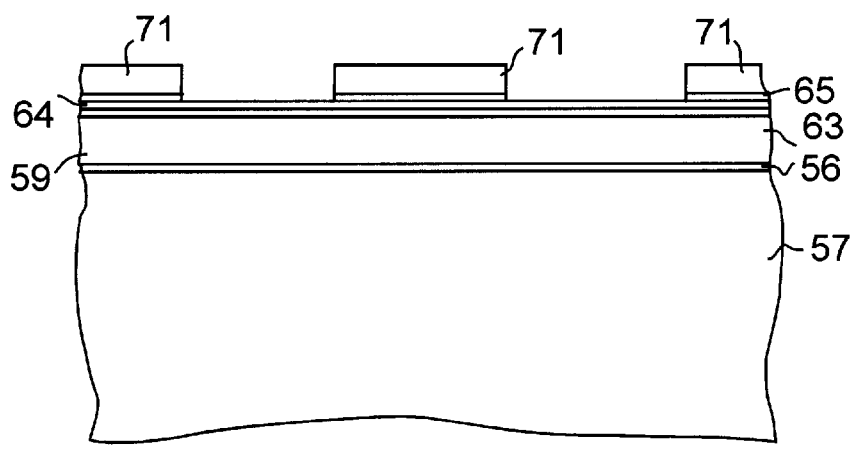
Figure 13:
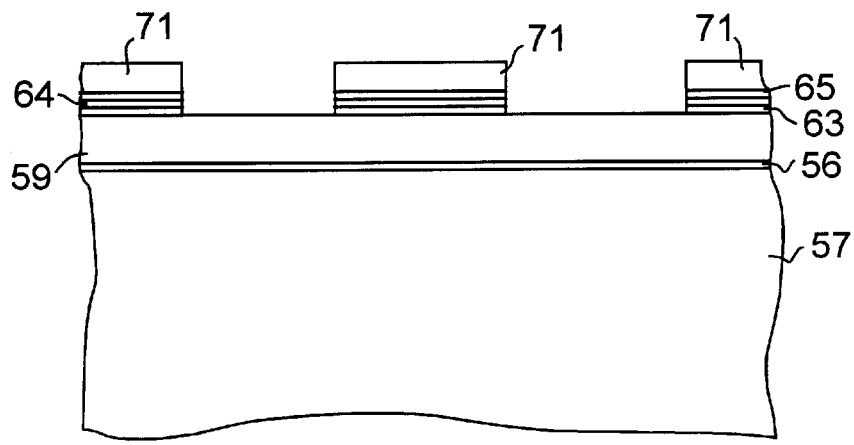

With reference to FIG. 12, the structure is then masked by a conventional photolithographic mask 71 to define the support arm configuration, and to provide access to the cavity that forms the air gap, as will be described. With the patterned photomask in place, the exposed portions of layers 63–65 are etched as shown in FIG. 12. These layers are preferably dry etched by RIE which is anisotropic and produces a well defined sidewall structure as represented in FIG. 13.

The cavity forming the air gap for the MARS device is then formed by isotropically etching the portions of layer 59 exposed by the openings formed by the last step. To obtain isotropic etching, and the necessary undercut to produce the desired cavity, a wet etchant is used. Various wet etchants may be used, for example HF. Etching proceeds laterally as well as vertically with the result shown in FIG. 14, i.e. cavity 72 formed below the optically active region.

In this fabrication sequence, it is preferred that layer 63 be of a material that is transparent to the optical signal because of the added processing complexity required if this layer requires patterning to form an optically transparent window. However, such procedures can be envisioned. The material forming layer 65 is also preferably transparent and may be indium tin oxide, or other suitable metal, but is preferably polysilicon as indicated above. Optionally, layer 65 can be gold, Ti—Pd—Au, Al, or other metallization material that is not transparent to the signal beam. In this case a window is formed by e.g. lithography as shown in FIGS. 15 and 16. In FIG. 15, photomask 73 is used to pattern layer 65 and form window 74 as shown in FIG. 16. The optical signal is represented by 75.

Computer modeling of MARS devices with insulating buffer layers as described above have established that the electrooptic performance of these devices is substantially unimpaired by the addition of the insulating layer on the substrate part of the air gap. Results of these tests are shown in FIGS. 17 and 18.

Figure 17:
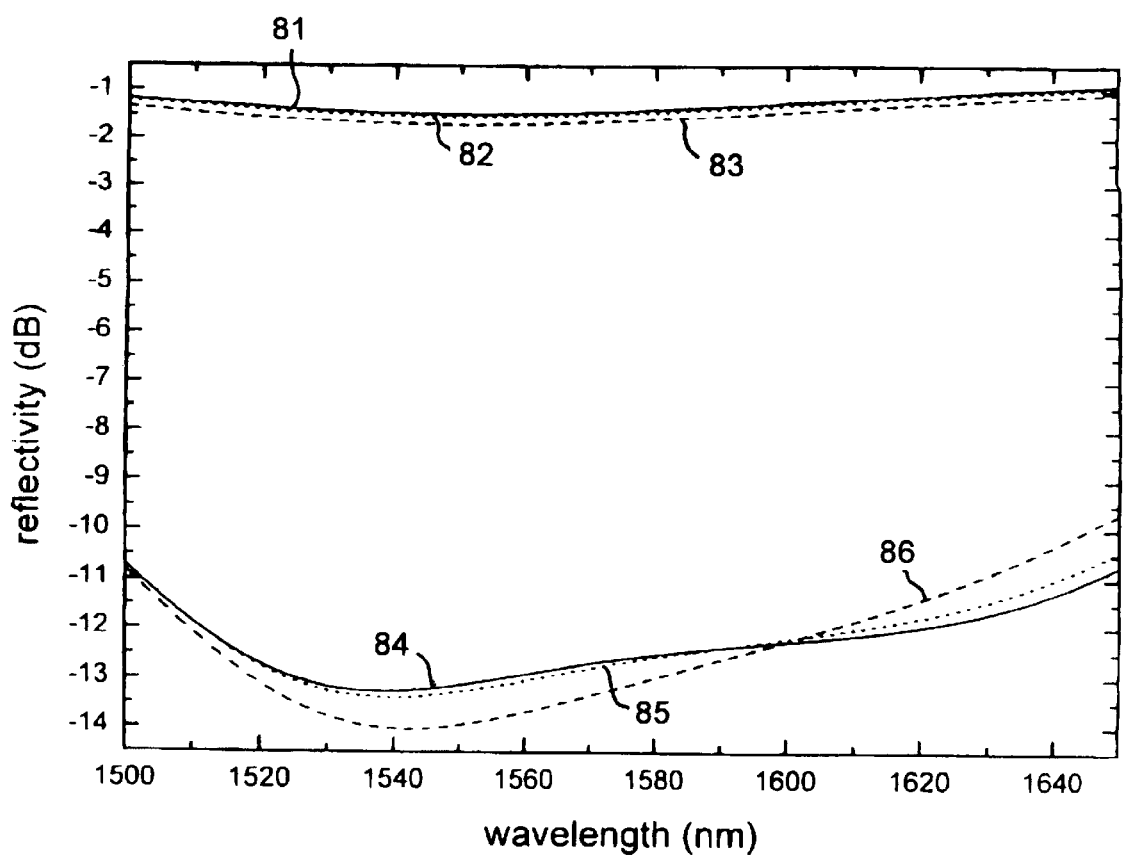
FIGS. 17 and 18 are plots giving electrooptic data for the improved MARS device.
Figure 18:
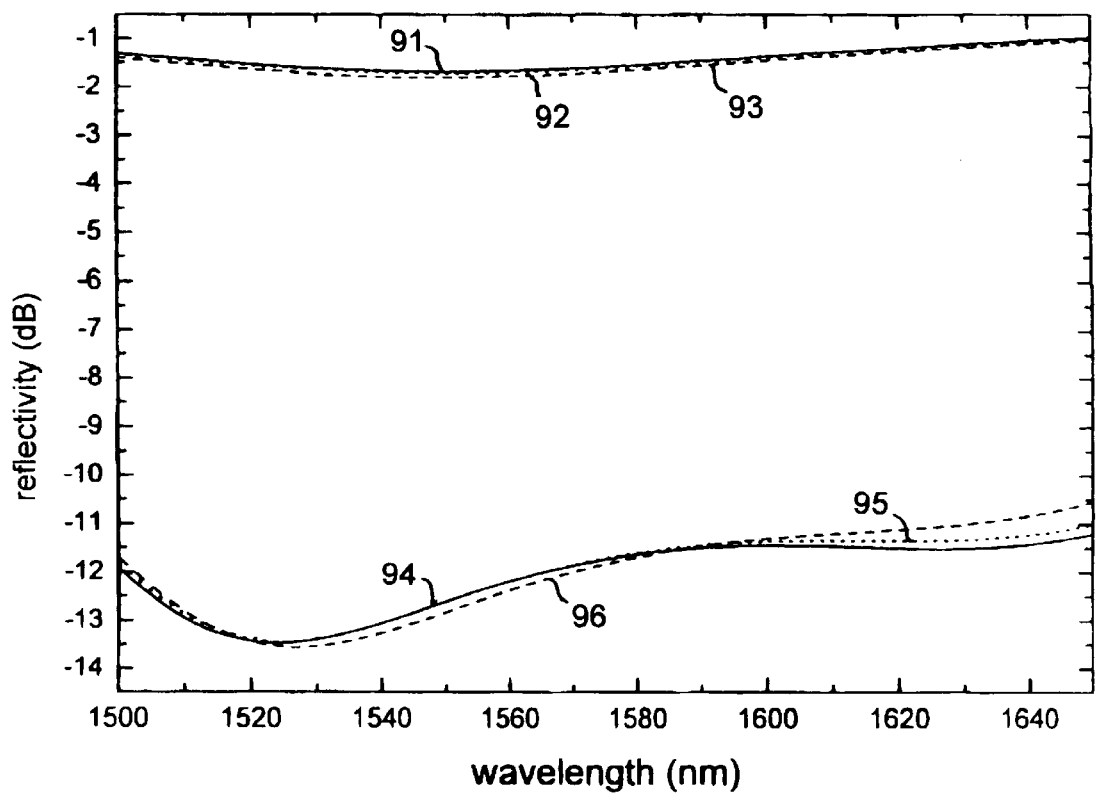

With reference to FIG. 17, six curves are shown. Curves 81–83 are measurements made in the reflecting state and curves 84–86 are for measurements made in the anti-reflecting state. The substrate in these devices was silicon with a refractive index of 3.48. The silicon nitride active optical layer was silicon nitride with a refractive index equal to the square root of 3.48, i.e. 1.87. The excursion of the optically active region of the membrane between the reflecting and anti-reflecting condition was 28%. The optical signal was at 1.55 $\mu$m. The solid curves, 91 and 94, show reflectivity for a conventional double-poly MARS device in which the silicon substrate is uncoated. The gap distance for the reflecting state was 11250 Angstroms, or approximately $3\lambda/4$, and the gap distance for the anti-reflecting state was 8100 Angstroms, or approximately $2\lambda/4$. The thickness of the glass offset layer (59 in FIG. 6) was 1.125 $\mu$m.

To determine the effect of the addition of the insulating buffer layer of the invention, two sample MARS devices were modelled with silicon nitride coatings on the silicon substrate. The silicon nitride insulating material may be stoichiometric or off-stoichiometry, and is most accurately represented as $SiN_x$. One silicon nitride coating was 300 Angstroms, and the results for this device are given by dotted curves 82 and 85 in FIG. 17. The gap distance in the reflecting state was 10925 Angstroms and the gap distance in the anti-reflecting state was 7865 Angstroms. The gap distance is measured from the surface of the insulating layer. To adjust for the presence of the insulating layer, the glass offset layer thickness was approximately 1.06 $\mu$m. If the thickness of the insulating layer is t, the approximate gap distance d can be expressed as:

$$d = m\lambda/4 - t$$

As is evident, the presence of the insulating layer on the silicon substrate hardly affects the electrooptic performance of the device.

A second device was modelled with an insulating layer of 600 Angstroms. In this device the gap in the reflecting state was 10555 Angstroms, and in the anti-reflecting state was 7600 Angstroms. Measurements on this device are given by the dashed curves 83 and 86. The glass offset layer in this device was approximately 1.0 $\mu$m.

Another series of double-poly devices was modelled with silicon nitride coatings of 200 Angstroms and 400 Angstroms, and these were compared with a device with an uncoated substrate. The results of these measurements are given in FIG. 18, and are similar to those shown in FIG. 17. The silicon nitride ($SiN_x$) insulating layer for these devices had a refractive index of approximately 2.0. Measurements for the device without the insulating layer are given in solid curves 91 and 94. The gap distance in the reflecting state was 11310 Angstroms and in the anti-reflecting state was 8140 Angstroms. Measurements on the device with a 200 Angstrom $SiN_x$ insulating layer are given by the dotted curves 92 and 95. The gap distance in the reflecting state was 11110 Angstroms, and in the anti-reflecting state was 8000 Angstroms. Measurements for the device with a 400 Angstrom SiNe insulating layer are given by the dashed curves 93 and 96. The gap distance for the reflecting state in this device was 10920 Angstroms, and in the anti-reflecting state was 7860 Angstroms. The deflection in each case was 28%.

The optical wavelengths of most interest in current photonic devices are 1.3 $\mu$m and 1.55 $\mu$m. These wavelengths correspond to spectral regions of ultra high transparency and resultant transmission efficiency in silica based transmission media. However, the invention described above is useful for any optical wavelength, e.g. 0.5–2.0 $\mu$m with suitable adjustment of the device dimensions.

From earlier discussions, e.g. in connection with FIGS. 1 and 2, it is apparent that the devices described above are useful for optical switches where the optical beam is switched between an optimally reflecting to an optically anti-reflecting state. The devices are also useful as variable optical attenuators and can be used in optical systems to equalize light intensity of multiple beams in e.g. WDM systems. In such applications the device is electrooptically switched or adjusted most typically between states that are partially reflecting (or partially anti-reflecting). In such applications it is important to have a useful continuum of reflectivity with a relatively linear or easily controlled electrooptic response. The devices described herein are useful in these applications.

The invention has been described in terms of a silicon substrate and silicon optoelectronic devices. It will occur to those skilled in the art that various forms of hybrid structures can also be used thus allowing flexibility in the choice of material for the optoelectronic device. In particular, gallium arsenide devices are widely used in lightwave technology. In the case of the MARS device, the electrical function of the device does not require a semiconductor material and a wide variety of conductive materials for the device substrate are possible. In the context of this disclosure, semiconductor materials such as silicon are intended to be within the definition of conductive materials. For other forms of optical modulators, crystal materials like lithium niobate could be used. In each of these cases the active device itself can be mounted or bonded on a silicon substrate to obtain the advantages of this invention.

Various additional modifications of the invention may be made by those skilled in the art. All variations that basically rely on the teachings through which this invention has advanced the art, or the equivalents of those variations, are properly considered within the scope of this invention.

We claim:

1. An electrooptic device comprising:
   (a) a conductive substrate having a refractive index $\eta$,
   (b) an insulating layer on said substrate, said insulating layer having a thickness t,
   (c) a membrane having an optically transparent portion and comprising at least three layers i,ii, and iii, wherein layer i has a refractive index approximately equal to $\eta$, layer ii has a refractive index approximately equal to $\eta^{1/2}$,
   layer iii has a refractive index approximately equal to $\eta$,
   (d) a flexible support for positioning the optically transparent portion of said membrane at a first position spaced from said substrate and defining an air gap $d_1$ between said optically transparent portion of said membrane and said insulating layer, and a second position spaced from said substrate defining an air gap $d_2$ between said optically transparent portion of said membrane and said insulating layer, and
   (e) means for applying an electrical bias between said conductive substrate and said membrane to switch said optically transparent portion of said membrane from said first position to said second position.

2. The device of claim 1 wherein $d_1$ and $d_2$ are approximately equal to $m\lambda/4-t$, and m is an odd integer for $d_1$ and an even integer for $d_2$.

3. An electrooptic modulator comprising:
   (a) a conductive substrate having a refractive index $\eta$,
   (b) an insulating layer on said substrate, said insulating layer having a thickness t,
   (c) means for directing a beam of light on said substrate, said light having a wavelength $\lambda$,
   (d) a membrane having an optically transparent portion and comprising at least three layers i,ii, and iii, wherein layer i has a refractive index approximately equal to $\eta$, and a thickness approximately equal to $\lambda/4$,
   layer ii has a refractive index approximately equal to $\eta^{1/2}$, and a thickness approximately equal to $\lambda/4$,
   layer iii has a refractive index approximately equal to $\eta$, and a thickness approximately equal to $\lambda/2$,
   (e) a flexible support for positioning the optically transparent portion of said membrane at a first position spaced from said substrate and defining an air gap $d_1$ between said optically transparent portion of said membrane and said insulating layer, and a second position spaced from said substrate defining an air gap $d_2$ between said optically transparent portion of said membrane and said insulating layer, and
   (f) means for applying an electrical bias between said conductive substrate and membrane to switch said optically transparent portion of said membrane from said first position to said second position.

4. The modulator of claim 3 wherein $d_1$ and $d_2$ are approximately equal to $m\lambda/4-t$, and m is an odd integer for $d_1$ and an even integer for $d_2$.

5. The modulator of claim 3 wherein said conductive substrate is a semiconductor.

6. The modulator of claim 3 wherein said conductive substrate is silicon.

7. The modulator of claim 4 wherein said insulating layer comprises $SiN_x$.

8. The modulator of claim 3 wherein $\lambda$ is 1.55 $\mu$m.

9. The modulator of claim 3 wherein layer(i) is polysilicon.

10. The modulator of claim 3 wherein layer(iii) is polysilicon.

11. The modulator of claim 10 wherein layer(i) is polysilicon.

12. A method for modulating light comprising:
    (a) directing a beam of light with a wavelength $\lambda$ on a conductive substrate, said substrate having a refractive index $\eta$, and an insulating layer on said substrate with a thickness t,
    (b) providing a membrane spaced from said substrate, said membrane having an optically transparent portion and comprising at least three layers i,ii, and iii, wherein layer i has a refractive index approximately equal to $\eta$, and a thickness approximately equal to $\lambda/4$,
    layer ii has a refractive index approximately equal to $\eta^{1/2}$, and a thickness approximately equal to $\lambda/4$,
    layer iii has a refractive index approximately equal to $\eta$, and a thickness approximately equal to $\lambda/2$,
    (c) providing a flexible support for positioning said optically transparent portion of said membrane at a first position spaced from said substrate and defining an air gap $d_1$ between said optically transparent portion of said membrane and said insulating layer, and a second position spaced from said substrate defining an air gap $d_2$ between said optically transparent portion of said membrane and said insulating layer, and
    (d) applying an electrical bias between said conductive substrate and said membrane to switch said optically transparent portion of said membrane from said first position to said second position.

13. The method of claim 12 wherein $d_1$ and $d_2$ are approximately equal to $m\lambda/4-t$, where m is an odd integer for $d_1$ and an even integer for $d_2$.

14. The method of claim 12 wherein said conductive substrate is a semiconductor.

15. The method of claim 14 wherein said conductive substrate is silicon.

16. The method of claim 12 wherein said insulating layer comprises $SiN_x$.

17. The method of claim 12 wherein $\lambda$ is 1.55 $\mu$m.

18. The method of claim 12 wherein layer(i) is polysilicon.

19. The method of claim 12 wherein layer(iii) is polysilicon.

20. The method of claim 19 wherein layer i is polysilicon.

21. A method for fabricating an electrooptic modulator comprising the steps of:
    (a) depositing an insulating layer on a semiconductor substrate,
    (b) depositing a glass layer on said insulating layer,
    (c) depositing a first layer of polysilicon on said glass layer,
    (d) depositing a dielectric layer on said first polysilicon layer, said dielectric layer selected from the group consisting of silicon dioxide and silicon nitride,
    (e) depositing a second layer of polysilicon on said dielectric layer,
    (f) masking said second polysilicon layer with a photomask having a central membrane feature and at least three arms extending from said central membrane feature to a peripheral frame, leaving exposed portions corresponding with spaces between said arms,
    (g) etching through said second polysilicon layer, said dielectric layer and said first polysilicon layer using a plasma etch and using said photomask as an etch mask, to form openings corresponding with said spaces between said arms and expose portions of said glass layer in said openings, and (h) etching through said glass layer in said exposed portions and under said arms using a wet etchant, thereby forming an air gap between said insulating layer and said central membrane feature and leaving said central membrane feature supported by said arms.

22. The method of claim 21 wherein the glass is phosphosilicate glass and the wet etchant comprises HF.

* * * * *